United States Patent [19]
Fifield

[11] 3,785,221
[45] Jan. 15, 1974

[54] LOAD CONTROL DEVICE
[76] Inventor: Ralph R. Fifield, 49 Bonnie Brae, Novato, Calif. 94547
[22] Filed: May 10, 1971
[21] Appl. No.: 141,506

[52] U.S. Cl............................ 74/242.11 P, 417/223
[51] Int. Cl............................................... F16h 7/12
[58] Field of Search........................... 417/218, 223; 192/82 T, 85 AT, 150; 74/216.5, 240, 130.17 M, 242.11 P

[56] References Cited
UNITED STATES PATENTS
259,350    6/1882    Windbiel et al. .............. 417/223 X
863,450    8/1907    Rosenblatt......................... 417/223
296,099    4/1884    Zastrow............................... 74/240

Primary Examiner—Charles J. Myhre
Assistant Examiner—Frank H. McKenzie, Jr.
Attorney—Mellin, Moore & Weissenberger

[57] ABSTRACT

A load control device for continuously running a source of power in a hydraulically activated system is disclosed having a housing carrying an idler bearing adapted to engage a belt driven by the source of power. A fluid inlet is associated with the housing and is in fluid communication with means for disengaging the bearing from the belt under no-load or dead-end conditions in the system.

4 Claims, 2 Drawing Figures

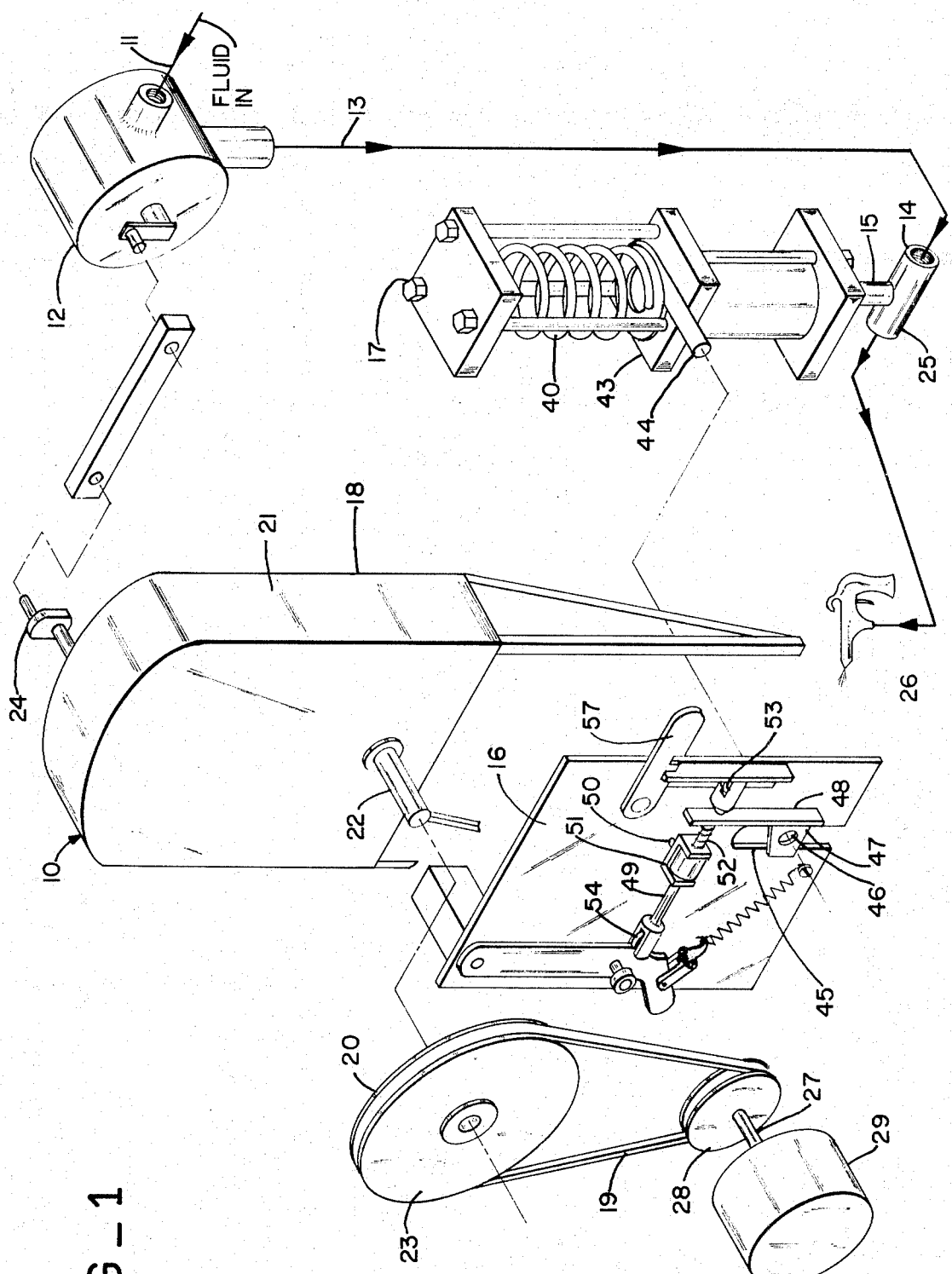

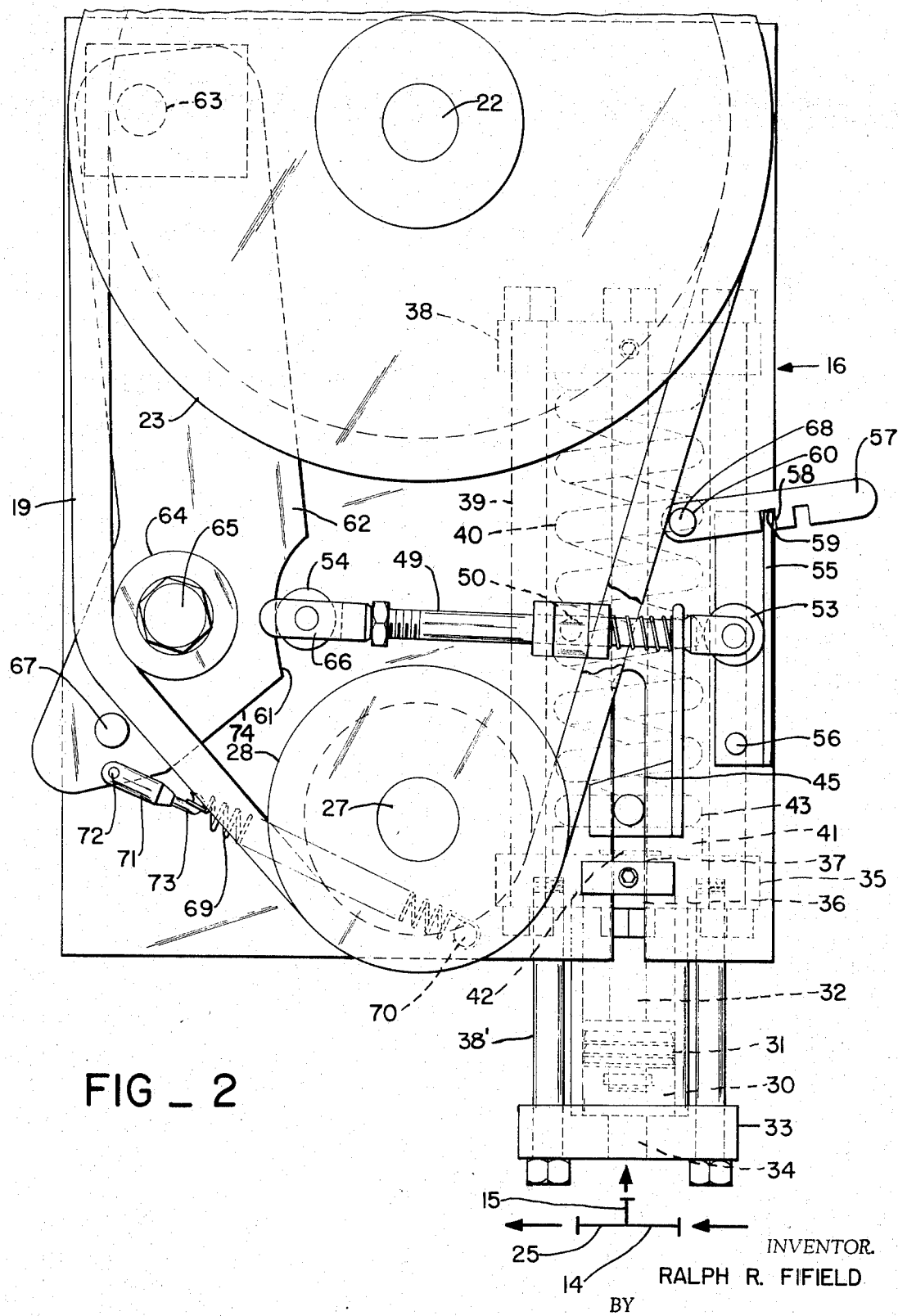
FIG_2

3,785,221

LOAD CONTROL DEVICE

BACKGROUND OF THE INVENTION

1. Field of the Invention

The invention relates to load control devices, and, more particularly, to a hydraulically activated system for enabling drive shafts coupled to a source of power to continuously run under no-load conditions when a fluid supply exceeds the demand or under dead-end conditions.

2. Description of the Prior Art

Hydraulically activated devices are well known for dispensing oil, paint, water, or the like. Generally, such devices are motor driven, as by any suitable power source, such as electric motors, gas engines, etc. If the supply of fluid being used, such as paint or oil, exceeds the demand for such fluid or dead-end conditions exist, it is necessary to shut down the power source. However, certain power sources, such as gas engines, cannot be readily shut off and then turned on again. Also, with certain fluids, such as oil, very expensive bypass control valves or the like are required if the unit is deactivated for any reason. Further, with certain fluids, such as paints, the paint aerates if the pump pumping the paint is not shut off when no-load or dead-end conditions take place.

There thus exists a need for a device which would enable drive shafts coupled to a power source to continuously run under no-load or dead-end conditions. Such a device should be readily usable with any conventional motor or gas engine.

SUMMARY OF THE INVENTION

It is an object of this invention to provide a load control device for enabling power sources in hydraulically activated systems to run continuously under all conditions.

It is a further object of this invention to provide apparatus which can continuously run a source of power under noload conditions where a fluid supply exceeds the demand, or under dead-end conditions.

These and other objects are preferably accomplished by providing a housing carrying an idler bearing which is adapted to engage a belt driven by a suitable source of power. A fluid inlet is associated with the housing and is in fluid communication with means for disengaging the bearing from the belt under no-load or dead-end conditions in a hydraulically activated system.

BRIEF DESCRIPTION OF THE DRAWINGS

FIG. 1 is an exploded view, partly schematic, of suitable apparatus for carrying out my invention; and FIG. 2 is a vertical view with portions omitted for convenience of illustration of a portion of the apparatus of FIG. 1.

DESCRIPTION OF THE PREFERRED EMBODIMENT

Referring now to the drawings, FIG. 1 shows a system 10 for carrying out my invention. A suitable source of fluid supply is introduced into the system 10 through fluid inlet 11. This inlet 11 leads into a suitable pump 12, shown schematically, which pump may be a piston type, gear, rotary, etc. In any event, fluid is pumped from pump 12 through fluid supply line 13 and through a tee joint 14. The branch portion 15 of joint 14 leads into a load control device 16 which is shown in detail in FIG. 2 and will be explained more fully hereinbelow. As shown in FIG. 1, load control device 16 includes a hydraulic cylinder section 17 which fits into a sub-housing section 18, section 18 including suitable mechanism thereon for engaging the belt 19 of a V-belt drive section 20. Section 20 in turn fits onto the upper end of a main housing section 21. Sub-housing section 18 fits onto the bottom of main housing section 21 as shown. Main housing section 21 may include suitable gear reduction mechanism therein (not shown), if desired. In any event, driving connection is provided between drive shaft 22 driven by main pulley 23 of belt drive section 20, through the aforementioned gear reduction mechanism, and crank shaft 24 which extends out of main housing section 21 and is in turn connected to suitable operating mechanism of pump 12 (e.g., the piston rod of a piston pump).

All of the above mechanisms and sections are coupled together by suitable nuts and bolts oe the like, screws, etc. The exact relationship of the various mechanisms of these sections will be described more fully hereinbelow with respect to FIG. 2. The main outlet 25 of tee joint 14 leads to a suitable hydraulically actuated mechanism, such as a spray gun 26. Of course, such mechanism may comprise hydraulically actuated cylinders, motors, controls, etc., and is thus not limited to nozzles or spray guns.

The apparatus described hereinabove with respect to FIG. 1 and more particularly the load control device 16, enables the drive shaft 27 of FIG. 1 which is connected to pulley 28 to run continuously under no-load conditions when the fluid supply to system 10 from inlet 11 exceeds the demand of spray gun 26 or the like, or under dead-end conditions in system 10. Drive shaft 27 is connected to a suitable power source, such as motor 29. This power source may be an electric motor, a gas engine, power take-off shafts, etc.

In operation, if the fluid supply through line 13 from pump 12 and to spray gun 26 exceeds the demand, or system 10 is under dead-end conditions, perssure in line 13 increases and this increase in pressure is fed thorugh the branch portion 15 of tee joint 14 into the hydraulic cylinder section 17 (see FIG. 2) of load control device 16.

Thus, referring to FIG. 2, load control device 16 is shown in detail. The hydraulic cylinder section 17 (see also FIG. 1) includes a hydraulic cylinder 30 having a piston 31 mounted therein. Piston 31 includes an upwardly extending piston rod 32 affixed thereto. Cylinder 30 is, of course, sealed with bottom plate 33 having a suitable passageway 34 in fluid communication with branch portion 15 of tee joint 14. Cylinder 30 also includes a top plate 35 having a suitable passageway 36 through which the upper end 37 of piston rod 32 passes. Suitable bolts 38' extend between plates 33 and 35 for securing the plates together. The upper portion of cylinder section 17 includes a top plate 38 bolted to the top plate 35 of cylinder 30 through suitable bolts 39.

A heavy duty compression spring 40 is disposed within the upper portion of cylinder section 17 and retained therein by bolts 39 and plates 35 and 38. A platen 41 is positioned immediately above piston rod 32. This platen 41 is any desired configuration, preferably a disk-like element having a recessed portion 42 on its lower surface (i.e., portion 42 does not go all the way through platen 41). The upper end 37 of piston rod 32 abuts against recessed portion 42 (i.e., the diameter of portion 42 generally conforms to the diameter of rod 32). A washer-like element in the form of an I-bolt 43 or the like is disposed above platen 41 and below the lower end of spring 40. As can be seen more particularly in FIG. 1, I-bolt 43 includes an integral pin portion 44 extending outwardly therefrom and past bolts 39.

It can be seen that, when fluid is introduced into cylinder 30, piston 31 is moved upwardly with rod 32 pushing both platen 41 and I-bolt 43 against spring 40 which compresses. The degree of compression of spring 40 is, of course, related to the pressure of the fluid from pump 12. Although a specific arrangement has been disclosed for moving I-bolt 43 (and, of course, integral pin portion 44) upwardly, any suitable fluid-actuated mechanism may be used.

Referring once again to FIG. 1, any suitable means may be used to secure cylinder section 17 to sub-housing section 18. The only requirement is that pin portion 44 extend out of subhousing section 18 through a slot 45 at the lower end thereof and into an aperture 46 formed in the plate portion 47 of arm 48.

The upper end of arm 48 includes an aperture through which an activating bar 49 extends. Bar 49 is pivotally attached at point 50 to the front of sub-housing section 18 by any suitable means, such as a U-shaped member 51. A spring 52 is disposed between member 51 and arm 48. Rollers 53 and 54 are disposed at each end of bar 49. These rollers are mounted so that they bear against suitable parts on sub-housing section 18. Thus, roller 53 bears against a pressure plate 55 which is pivotally attached to the front of sub-housing section 18 as at pivot point 56. Pressure plate 55 is held in fixed position by a release arm 57 having a slot 58 for receiving the upper end 59 of plate 55. Arm 57 is also pivotally attached to the front of sub-housing section 18 at pivot point 60.

Roller 54 engages a cam surface 61 formed on a pressure arm 62. The radius of bar 49 between pivot point 50 and roller 54 is related to the radius defined by cam surface 61. Arm 62 is in turn pivotally mounted on the front of sub-housing section 18 at pivot point 63. An idler bearing 64 is mounted on pressure arm 62 by any suitable means (e.g., a suitable nut-and-bolt arrangement 65). It can be seen from FIG. 2 that roller 54 is retained on bar 49 by a U-bolt 66 connected thereto so that the arms of U-bolt 66 also serve as means for retaining cam surface 61 therebetween and thus in contact with roller 54.

Referring back to FIG. 1, drive shaft 22 is adapted to receive main pulley 23 thereon. Belt 19 thus extends about main pulley 23 and pulley 28 which is not mounted on sub-housing section 18 but of course includes drive shaft 27. In this arrangement, as can be seen in FIG. 2, idler bearing 64 bears against V-belt 19. A belt confining pin 67 extends outwardly from pressure arm 62. The belt 19 thus passes between pin 67 and idler bearing 64. A like pin 68 extends outwardly from release arm 57 (at the point of connection 60 of arm 67 to section 18). At this point, belt 19 is confined between pin 68 and pulleys 23 and 28.

Pressure arm 62 is biased for disengagement of idler bearing 64 with belt 19 by spring 69. Spring 69 is connected at one end 70 to sub-housing section 18 and at the other end to arm 62, as by a U-bolt 71 pivotally connected to arm 62 at pivot point 72 and having an S-hook 73 coupled to spring 69. Of course, any suitable arrangement may be used to bias arm 62 for disengagement of bearing 64 from belt 19.

As can be seen, pressure plate 55 is held into engagement with rollers 53 by means of the notch or slot 58 in release arm 57.

In operation, with the various mechanisms in engagement as shown in FIG. 2, V-belt 19 is driven by drive shaft 27 which is coupled to a power source and pulley 28 coupled to shaft 27 which pulley 28 in turn drives main pulley 23, pulley 23 being mounted on drive shaft 22. If necessary, drive shaft 22 is coupled to suitable speed reducing gears (not shown) within main housing section 21 which gears operate crank shaft 24 (FIG. 1). Of course, drive shaft 22 may be coupled directly to crank shaft 24, if possible.

As discussed hereinabove, crank shaft 24 is connected to the actuating mechanism, such as the piston rod (not shown) of a suitable pump 12. Pump 12 generates fluid pressure, as also discussed hereinabove, which fluid flows through line 13 to tee joint 14 and thus to the nozzle of spray gun 26.

When the pressure in line 13 exceeds the demand or is under dead-end conditions, fluid flows thorugh tee joint 14 into cylinder 30 forcing piston 31 and its rod 32 (FIG. 2) upwardly against platen 41 which in turn compresses spring 40 and moves pin portion 44 upwardly within slot 45 and thus moves arm 48 so that activating bar 49 pivots on pivot point 50 causing the outer end of bar 49 to move rollers 54 along cam surface 61 to surface 74 so that pressure arm 62 moves in a direction away from engagement with V-belt 19. This, in turn, releases the engagement of idler bearing 64 with V-belt 19, deactivating pulley 28, drive shaft 22 and pump 12. The V-belt 19 is guided downwardly by V-belt confining pins 67 and 68.

When the pressure in the fluid supply line 13 decreases, piston rod 32 and piston 31 are forced downwardly by the pressure of spring 40, thus causing the activating bar 49 to move along surface 74 to cam surface 61 causing the idler bearing 64 to again engage V-belt 19 activating the mechanism so pressure pump 12 again operates to increase pressure of the fluid in the fluid supply line 13.

In this way, the power force affixed to shaft 27 continuously operates and the pressure of fluid in the fluid supply line 13 may always be maintained at a predetermined pressure.

I claim:

1. A load control device for continuously running a source of power in a hydraulically activated system comprising:
   a housing;
   a fluid inlet associated with said housing;
   idler bearing means carried by said housing adapted to engage a belt driven by said source of power; and
   fluid activated idler bearing disengagement means associated with said housing and in fluid communication with said inlet for selectively disengaging said idler bearing means from contact with said belt, said fluid activated idler bearing disengagement means including a spring-biased hydraulic cylinder mounted on said housing in fluid communication with said inlet, said cylinder having a piston movable therein by the introduction of fluid into said cylinder and a piston rod connected to said piston, the movement of said piston rod effecting selective disengagement of said idler bearing means from contact with said belt, and said idler bearing means including a cam surface associated therewith, and roller means coupled to said piston rod in rolling engagement with said cam surface, the movement of said piston rod being adapted to move said roller means into and out of engagement with said cam surface to selectively engage and disengage said idler bearing means from contact with said belt, said disengagement means including an activating bar pivotally connected to said housing and movable upon movement of said piston rod, said roller means being disposed at one end of said bar and second roller means disposed at the other end of said bar bearing against a pressure plate mounted on said housing.

2. The device of claim 1 wherein said pressure plate is pivotally mounted on said housing and held in fixed position relative thereto by a release arm pivotally mounted on said housing, said release arm having means thereon adapted to engage said plate and hold it in selective fixed position.

3. Apparatus for continuously running a source of power comprising:
a fluid supply inlet;
a fluid discharge outlet in fluid communication with said inlet;
a branch portion disposed between said inlet and outlet in fluid communication therewith, said branch portion opening into a fluid housing inlet of a houisng;
pumping means associated with said fluid supply inlet for pumping fluid therein;
idler bearing means carried by said housing engaging a belt driven by said source of power;
fluid activated idler bearing disengagement means associated with said housing and in fluid communication with said fluid housing inlet for selectively disengaging said idler bearing means from contact with said belt;
first pulley means associated with said housing driven by said belt for operating said pumping means; and
second pulley means having a drive shaft connected thereto coupled to said source of power for driving said belt when said idler bearing means is in engagement with said belt, said fluid activated idler bearing disengagement means including a spring-biased hydraulic cylinder mounted on said housing in fluid communication with said fluid housing inlet, said cylinder having a piston movable therein by the introduction of fluid into said cylinder and a piston rod connected to said piston, the movement of said piston rod effecting selective disengagement of said idler bearing means from contact with said belt, and said idler bearing means including a cam surface associated therewith, and roller means coupled to said piston rod in rolling engagement with said cam surface, the movement of said piston rod being adapted to move said roller means into and out of engagement with said cam surface to selectively engage and disengage said idler bearing means from contact with said belt, said disengagement means including an activating bar pivotally connected to said housing and movable upon movement of said piston rod, said roller means being disposed at one end of said bar and second roller means disposed at the other end of said bar bearing against a pressure plate mounted on said housing.

4. The apparatus of claim 3 wherein said pressure plate is pivotally mounted on said housing and held in fixed position relative thereto by a release arm pivotally mounted on said housing, said release arm having means thereon adapted to engage said plate and hold it in selective fixed position.

* * * * *